May 23, 1933. W. H. MOYER 1,910,352
CENTRIFUGAL CLUTCH
Filed Feb. 16, 1931
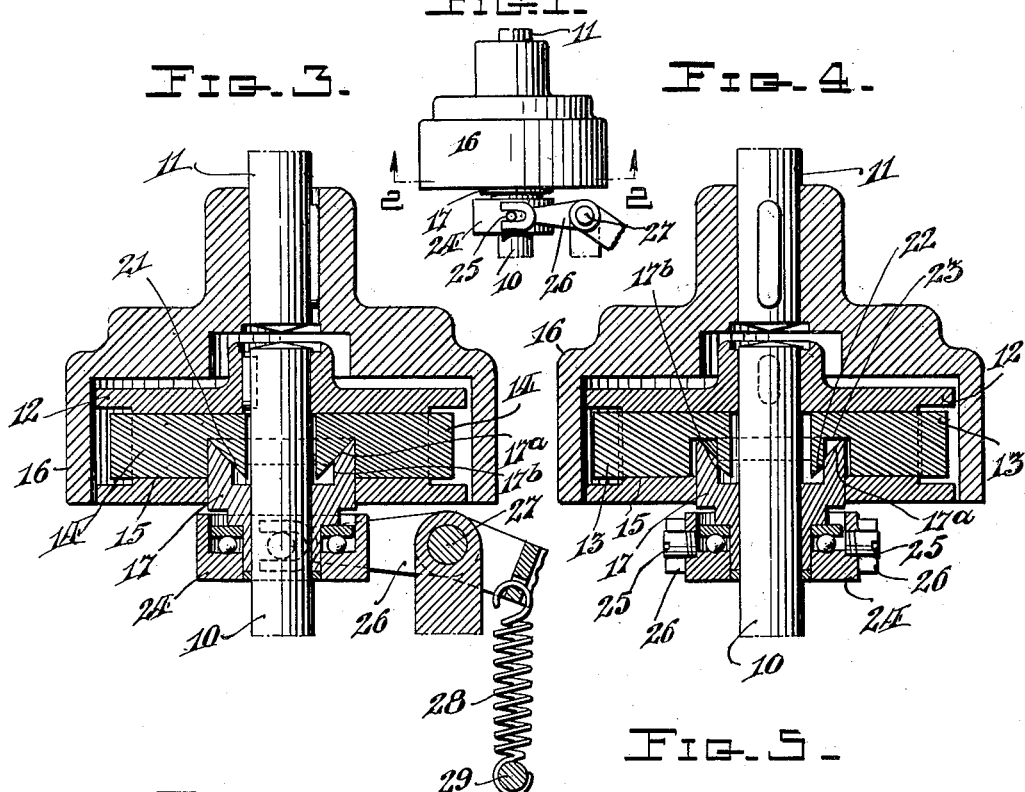
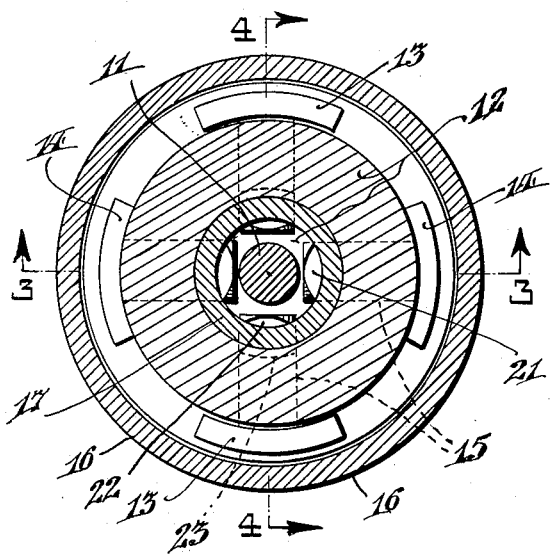
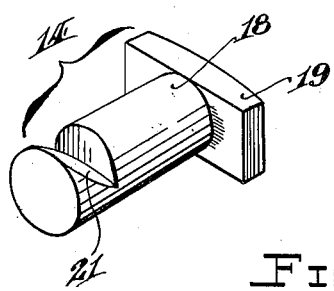
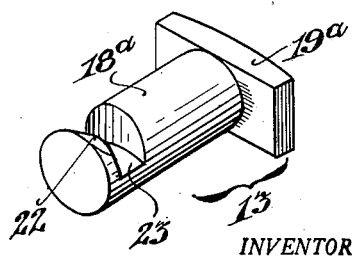
INVENTOR.
William H. Moyer,
BY *Alfred E. Ischinger*
ATTORNEY.

Patented May 23, 1933

1,910,352

UNITED STATES PATENT OFFICE

WILLIAM H. MOYER, OF WEST LAWN, PENNSYLVANIA, ASSIGNOR TO TEXTILE MACHINE WORKS, OF WYOMISSING, PENNSYLVANIA, A CORPORATION OF PENNSYLVANIA

CENTRIFUGAL CLUTCH

Application filed February 16, 1931. Serial No. 516,053.

This invention relates to centrifugal clutches, and more particularly to the type utilized in centrifugal extractors and the like for automatically connecting and disconnecting a driving and a driven member with capacity for controlling or being controlled by cooperating means.

One object of my invention is to provide a novel and simplified clutch and one having controlling means effective to prevent connection of the driving with the driven member under certain operating conditions and while the driving member is actuated.

Another object is to provide novel flyweights for such a clutch adapted to cooperate with the controlling means in such manner that excessive pressure on, or straining of the latter is prevented under the above mentioned conditions.

The invention comprises the novel elements, features of construction and arrangement of parts in cooperative relationship as herein disclosed by one embodiment thereof, reference to which will make the above and other objects as well as attendant advantages more readily apparent.

In the drawing:

Fig. 1 is a side elevational view of the centrifugal clutch of my invention.

Fig. 2 is an enlarged cross-sectional view through the clutch, taken substantially as indicated by the arrows 2—2 on Fig. 1.

Figs. 3 and 4 are central sectional views taken as indicated by the arrows 3—3 and 4—4 on Fig. 2.

Figs. 5 and 6 are similar perspective views, on a still larger scale, of certain centrifugally operated members or flyweights forming part of my invention.

By referring more particularly to Figs. 2 to 6 inclusive, it will be noted that the centrifugal clutch of my invention comprises a driving element 10, which may be a motor or drive shaft; a driven element 11, such as the container shaft of a centrifugal extractor; a flyweight mounting or housing 12 rigidly mounted on the driving element 10; and flyweights or clutching members 13 and 14 which are freely slidable in radial bores 15 of the mounting 12 and adapted to serve the dual function of frictionally locking with a connecting member 16 fixed on element 11, and to actuate clutch control means 17, in the present instance a cam collar freely slidable on element 10.

Flyweights 14 consist of a cylindrical shank or stem 18, a friction shoe 19, and a cam 21. Flyweights 13 are similar in construction except for a shorter cam 22 which terminates in a notch or cut-out part 23; the corresponding parts thereof being indicated by like reference numerals having the exponent $a$.

In order to urge the cam collar 17 upwardly to the normal or inactive position illustrated in Fig. 3, the lower end thereof is revolubly seated in a collar 24 which serves as an antifriction thrust bearing, provided with opposed studs 25, forming a loose connection with the slotted bifurcations at the end of a forked lever 26, pivoted at 27 and acted on by a tension spring 28, anchored at 29, constituting means for biasing the clutching members 13 and 14 towards a position of disengagement relative to the clutch member 16. When the drive member 10 is at rest, the spring 28 acting through lever 26 on collar 17, moves the latter upwardly to the position illustrated in Fig. 3, thereby moving flyweights 13 and 14 to their normal or inactive position.

From Figs. 3 and 4, it will be apparent that when the mounting 12 on driving element 10 is revolved, the weights 13 and 14 will travel outwardly by centrifugal action. The cam collar 17 will then be first moved downwardly on said driving element, against the action of spring 28, by the action of cams 21 of the weights 14 on cam part $17a$ of collar 17. This movement will continue until the flange edge $17b$ of collar 17 is withdrawn from the notches 23 of flyweights 13, (see Fig. 4,) and cams 22 on flyweights 13 are also aligned with the cam surface $17a$ of the collar 17, after which the combined and therefore increased action of flyweights 13 and 14 will move the collar downwardly. The friction shoes 19 and $19a$ are now in peripheral alignment and simultaneously advance and engage the inner surface of the annular member 16, thereby frictionally locking shafts 10 and 11 together for united rotation.

As well known, centrifugal clutches of this type are applied to centrifugal machines such as hydroextractors, for the purpose of automatically connecting and disconnecting the motor or drive shaft and container shaft. Such machines are ordinarily provided with a safety guard or cover which cooperates with the clutch and is automatically locked or unlocked thereby. One such arrangement is illustrated in the pending application of Christian F. Meyer, Serial No. 476,360 filed August 19, 1930, which application is assigned to the assignee of the present application.

It will be readily understood that my improved clutch could be substituted for the one shown in the mentioned application and the flyweight operated collar 17 could be utilized to control the clutch and the safety guard by connecting it with the latter through lever 26.

It is to be particularly noted that when sufficient force is applied to the lever 26 so as to maintain the flyweights 13 and 14 in withdrawn position in order to prevent the clutch from operating, as by cooperating means such for example as the safety guard mechanism set forth in the mentioned application, and the driving member 10 is rotated, only the centrifugally developed pressure of the flyweights 14 on collar 17 will oppose this force, and not the combined action of all the flyweights as in clutches heretofore available for this purpose. It will thus be seen that by varying or modifying the cam arrangement of the flyweights their action on the control collar 17 can be varied within wide limits.

Of course, the centrifugal clutch shown and described can be changed and modified in various ways without departing from the invention herein disclosed and hereinafter claimed.

I claim:

1. In a centrifugal clutch, the combination of a driving member and a driven member, a plurality of centrifugal clutching members carried by said driving member, and means actuated in accordance with the speed of said driving member for causing said clutching members successively to move from a position of disengagement towards a position of frictional clutching engagement with said driven member.

2. In a centrifugal clutch, the combination of a driving member and a driven member, a plurality of centrifugal clutching members carried by said driving member and controlled by the speed thereof for engaging said driven member, means for biasing said clutching members towards a position of disengagement with respect to said driven member, and control means for causing certain of said clutching members to move from their position of disengagement a predetermined distance towards a position of clutching engagement prior to movement of the remainder of said clutching members so that the action of said biasing means is initially opposed by the movement of said certain of the clutching members only, said control means thereafter causing all of said clutching members to simultaneously move towards a position of clutching engagement so that the action of said biasing means is opposed by the combined action of said clutching members.

3. In a centrifugal clutch, the combination of a driving member and a driven member, a plurality of centrifugal clutching members carried by said driving member and controlled by the speed thereof for engaging said driven member, means for biasing said clutching members towards a position of disengagement with respect to said driven member, and control means for causing certain of said clutching members to move from their position of disengagement a predetermined distance towards a position of clutching engagement prior to movement of the remainder of said clutching members so that the action of said biasing means is initially opposed by the movement of said certain of the clutching members only, said control means thereafter causing all of said clutching members to simultaneously engage said driven member whereby the action of said biasing means is opposed by the combined action of said clutching members.

4. In a centrifugal clutch, the combination of a driving member and a driven member, a plurality of centrifugal clutching members carried by said driving member and controlled by the speed thereof for contacting said driven member in frictional clutching engagement therewith, means for biasing said clutching members towards a position of disengagement with respect to said driven member, and control means for causing certain of said clutching members to move from their position of disengagement a predetermined distance towards a position of clutching engagement prior to movement of the remainder of said clutching members so that the action of said biasing means is initially opposed by the movement of said certain of the clutching members only, said control means thereafter causing all of said clutching members to simultaneously contact said driven member in frictional clutching engagement therewith whereby the action of said biasing means is opposed by the combined action of said clutching members.

5. In a centrifugal clutch, the combination of a driving member and a driven member, a plurality of centrifugal clutch members carried by said driving member, and means actuated in accordance with the speed of said driving member for causing said clutch members to successively move a predetermined distance toward said driven member and thereafter to simultaneously advance into frictional clutching engagement with said member.

6. In a centrifugal clutch, the combination of a driving member and a driven member, a plurality of centrifugal clutching members carried by said driving member and adapted to travel in radial directions therefrom to contact with said driven member in frictional clutching engagement therewith, and means for causing radial movement of certain of said clutch members a predetermined distance prior to movement of certain other of said clutch members and thereafter to cause all of said clutch members to simultaneously advance into frictional clutching engagement with said driven member.

7. In a centrifugal clutch, the combination of a driven member and a driving member comprising a housing, a plurality of centrifugal clutching members within said housing adapted to travel outwardly to contact said driven member in frictional clutching engagement therewith, means to prevent the radial movement of certain of said clutch members during actuation of certain other of said clutch members, said latter clutch members provided with locking means movable axially with respect to said driving member.

8. In a centrifugal clutch, the combination of a driven member and a driving member comprising a housing, a plurality of centrifugal clutch members within said housing adapted to travel in radial directions to contact said driven member in frictional clutching engagement therewith, and means actuated in accordance with the speed of said driving member for causing said clutch members to successively travel radially to a predetermined point of peripheral alignment with each other and for causing subsequent movement of said clutch members in peripheral alignment with each other.

9. In a centrifugal clutch, the combination of a driving member comprising a housing, a driven member, a plurality of frictional clutch members substantially enclosed in said housing and adapted to move in a radial direction to contact said driven member in frictional clutching engagement therewith, said clutch members having cylindrical body portions reciprocable within said housing, and means for causing said clutch members successively to move towards a position of engagement with said driven member.

10. In a centrifugal clutch, the combination of a driving member and a driven member, a plurality of centrifugal clutching members enclosed by said driving member and controlled by the speed thereof for engagement with said driven member, means for biasing said clutching members towards a position of disengagement with respect to said driven member, and control means for causing certain of said clutching members to move a predetermined distance prior to movement of the remainder of said clutching members so that the action of said biasing means is initially opposed by said certain of the clutching members only, said control means thereafter causing all of said clutching members to simultaneously oppose the action of said biasing means.

11. In a centrifugal clutch, the combination with a driving element, and a driven element; of two flyweights on said driving element each provided with means for engaging the driven element and a cam, a control collar slidably mounted on the driving element adapted to coact first with the cam of one and then with the cams of both of said flyweights, and a spring pressed lever for yieldably retaining the flyweights and the engaging means in retracted positions.

12. In a centrifugal clutch, the combination with a driving element, and a driven element; of two flyweights on said driving element each provided with means for engaging the driven element and a cam, a cam collar slidably mounted on the driving element adapted to coact first with the cam of one and then with the cams of both of said flyweights, a second collar, means for preventing rotation of said second collar, and spring pressed lever means acting on said cam collar through said second collar to move the flyweights to their normal or inactive positions.

13. In a centrifugal clutch, the combination with a driving element, and a driven element; of a flyweight mounting on said driving element provided with radial bores, two sets of flyweights freely movable in said bores the flyweights of each set being provided with means for engaging the driven element and a cam, a clutch control collar slidably mounted on the driving element adapted to be moved first by the cams of one set and then by the cams of both of said sets of flyweights, a second collar, means for preventing rotation of said collar, and a yieldable lever for retracting the flyweights to an inactive position by the coaction of said collar.

14. In a centrifugal clutch, the combination with a driving element, a driven element, and two sets of flyweights establishing connection therebetween; of flyweight control means including a collar, means for preventing rotation of said collar, and a spring pressed lever, said control means adapted to progressively cooperate with said sets of flyweights.

15. In a centrifugal clutch, the combination with a driving element, a driven element, and two flyweights for establishing connection therebetween; of axially aligned flyweight control means comprising a cam member, a second member, and means including said second member for supporting said cam member, said control means adapted to progressively coact with said flyweights and including a spring pressed lever for yieldably opposing movement of the control means.

In testimony whereof I affix my signature.

WILLIAM H. MOYER.